E. S. MILLER.
VEHICLE DRIVE.
APPLICATION FILED JUNE 1, 1920.
1,394,328.
Patented Oct. 18, 1921.
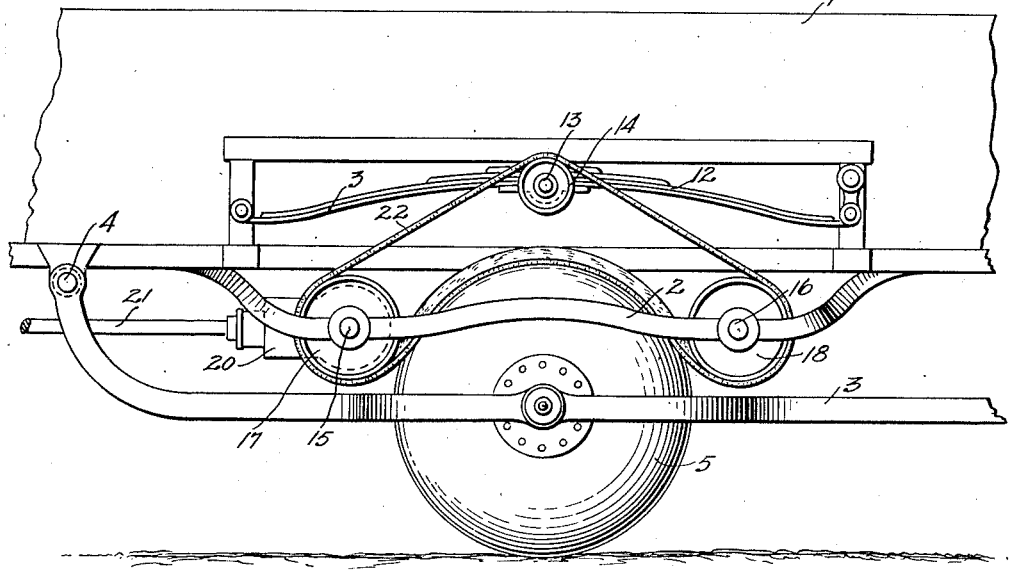
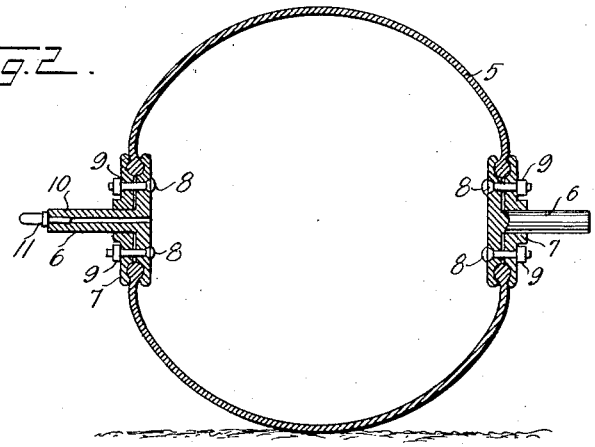
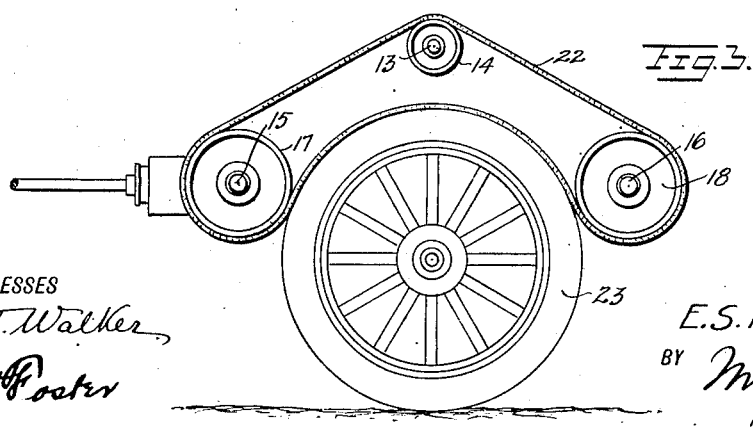
WITNESSES
INVENTOR
E. S. MILLER
BY
ATTORNEYS

UNITED STATES PATENT OFFICE.

EDWIN S. MILLER, OF MASSILLON, OHIO.

VEHICLE-DRIVE.

1,394,328. Specification of Letters Patent. Patented Oct. 18, 1921.

Application filed June 1, 1920. Serial No. 385,549.

*To all whom it may concern:*

Be it known that I, EDWIN S. MILLER, a citizen of the United States, and a resident of Massillon, in the county of Stark and State of Ohio, have invented a new and Improved Vehicle-Drive, of which the following is a full, clear, and exact description.

This invention relates to improvements in vehicle drives, an object of the invention being to provide improved means for driving or propelling the vehicle by means of an endless device engaging the outer surface or periphery of the wheel to transmit rotary motion to the wheel.

A further object is to provide a vehicle with an improved propelling means consisting of an endless belt mounted upon pulleys and driven by one or more of said pulleys, said belt contacting with the outer surface or periphery of the wheel and causing the wheel to be turned by the frictional engagement of the belt therewith.

A further object is to provide an improved construction of vehicle wheel consisting of a pneumatic ball or spherical member comprising a pneumatic cushion and operated by contact of an endless belt with the periphery thereof.

With these and other objects in view the invention consists in certain novel features of construction, and combinations and arrangements of parts as will be more fully hereinafter described and pointed out in the claims.

In the accompanying drawings—

Figure 1 is a view in side elevation illustrating my invention.

Fig. 2 is a view in transverse section through the wheel shown in Fig. 1.

Fig. 3 is a view in elevation illustrating my invention with an ordinary type of pneumatic or other form of wheel.

1 represents the frame of a vehicle body and 2 a bar or support positioned under the frame 1 and fixedly connected thereto and below the bar 2 is an underslung frame 3 preferably having hinged connection, as shown at 4, with the body frame 1.

The frame 3 is slotted or bowed to accommodate my improved wheel 5 and this wheel is preferably of general spherical shape composed of rubber and canvas and other suitable material constituting a pneumatic cushion.

The wheel 5 is provided with axle stubs or spindles 6 which are securely held in the opposite sides of the wheel by means of clamping plates 7 with bolts 8 and nuts 9 clamping the parts together. One of these spindles 6 is tubular and constitutes an air inlet duct 10 having a valve 11 at its outer end to control the air and permit an inflation or deflation of the wheel.

A bow spring 12 is mounted in frame 1 and supports a shaft 13 on which a pulley 14 is mounted to turn. The bar 2 provides rotary mounting for a pair of shafts 15 and 16 at opposite sides of the wheel 5 and on these shafts 15 and 16 pulleys 17 and 18 are mounted. The pulley 17 has a fixed relation to the shaft 15 and this shaft 15 constitutes a driven shaft to impart rotary motion to the pulley 17, and I have illustrated a transmission gear casing 20 to indicate diagrammatical means for transmitting motion from a drive shaft 21 to the driven shaft 15.

An endless friction belt 22 is positioned around the pulleys 17, 14 and 18 and the lower run of this belt 22 tightly engages the upper portion of the outer surface or periphery of the wheel 5 so that as motion is transmitted to the belt, through the medium of the pulley 17, the belt will frictionally drive the wheel 5 and propel the vehicle.

In Fig. 3 I illustrate my invention in connection with an ordinary type of pneumatic or other form of wheel 23, but in other respects the structure is precisely as above explained.

While I have illustrated but one wheel and its driving means, it is obvious that this driving means can be employed in connection with any number of wheels on a vehicle and I do not limit myself in this respect.

With the structure above described, not only is rotary motion imparted to the wheel 5, but also the belt 22 with its mounting provides a cushioning connection between the vehicle and the wheel so that the belt and its connections absorbs shocks and jars in addition to the shocks and jars absorbed by the wheels, and the spring 12 compensates for varying movements of the parts so that a tight frictional engagement between the belt and the wheel is at all times possible.

It is obvious that my invention might be employed in connection with any type of motor vehicle, such as automobiles, tractors, etc., and that I may employ other forms of endless propeller other than a belt, such for example, as a sprocket chain with coöperating parts, and I would have it understood that I wish to cover broadly the idea of propelling means engaging the periphery of the rotary traction member to transmit motion thereto.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. The combination with a vehicle traction wheel, of a pair of pulleys having fixed relationship to each other, an endless belt around the pulleys having its lower run engaging the periphery of the wheel, and an elastically supported pulley supporting the upper run of said belt.

2. The combination with a wheel, of a pair of pulleys having fixed relationship to each other, an endless belt around the pulleys having its lower run engaging the periphery of the wheel, a bow spring, and a pulley mounted intermediate the ends of the bow spring and supporting the upper run of said belt.

3. The combination with a vehicle, and a wheel supporting the vehicle and movable relative to the vehicle, of a pair of pulleys having fixed relation to the vehicle, an endless belt around said pulleys having its lower run engaging the periphery of the wheel, one of said pulleys constituting a driving element, and a third pulley having elastic connection with the vehicle and supporting the upper run of said belt.

EDWIN S. MILLER.